United States Patent Office 3,465,851
Patented Sept. 9, 1969

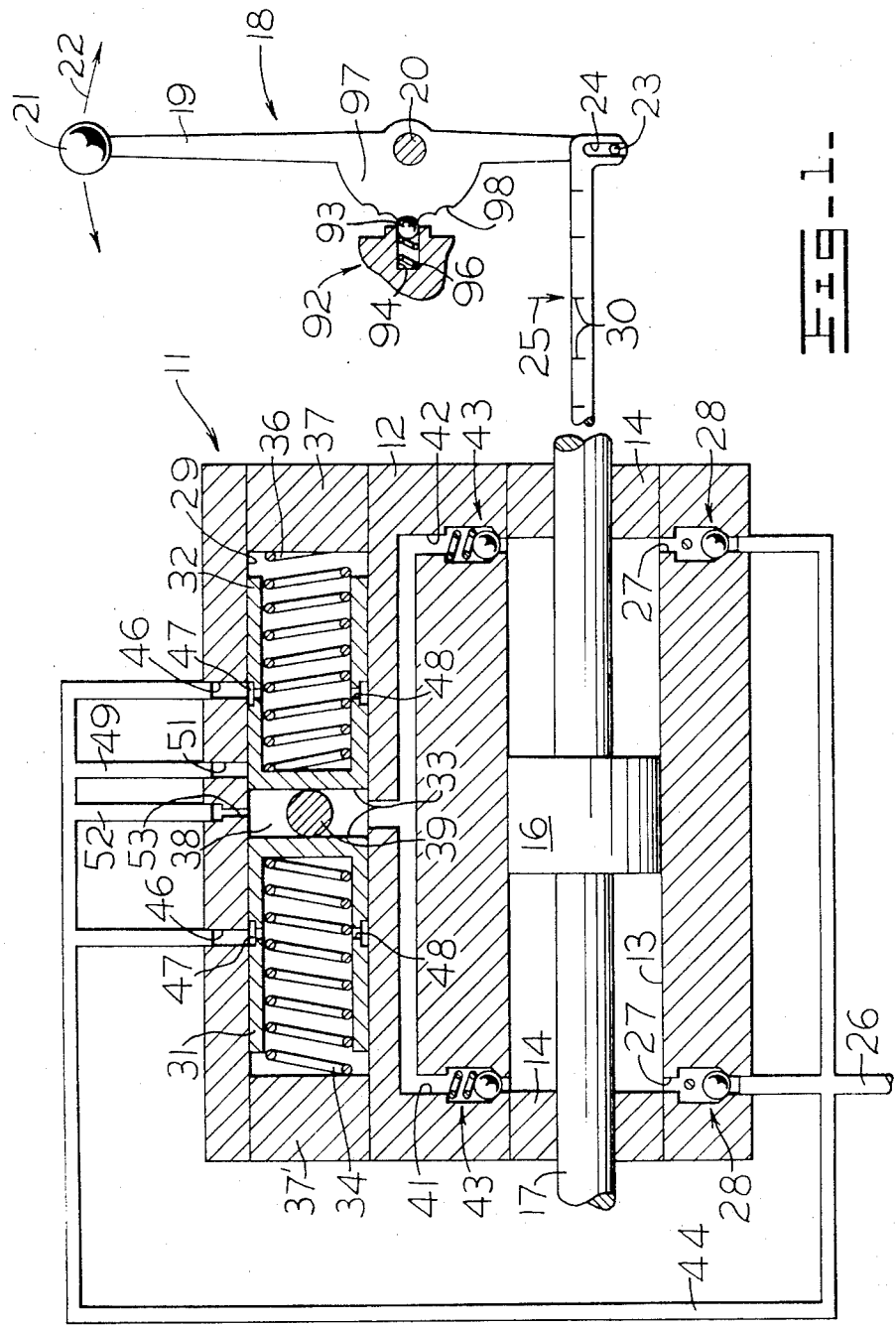

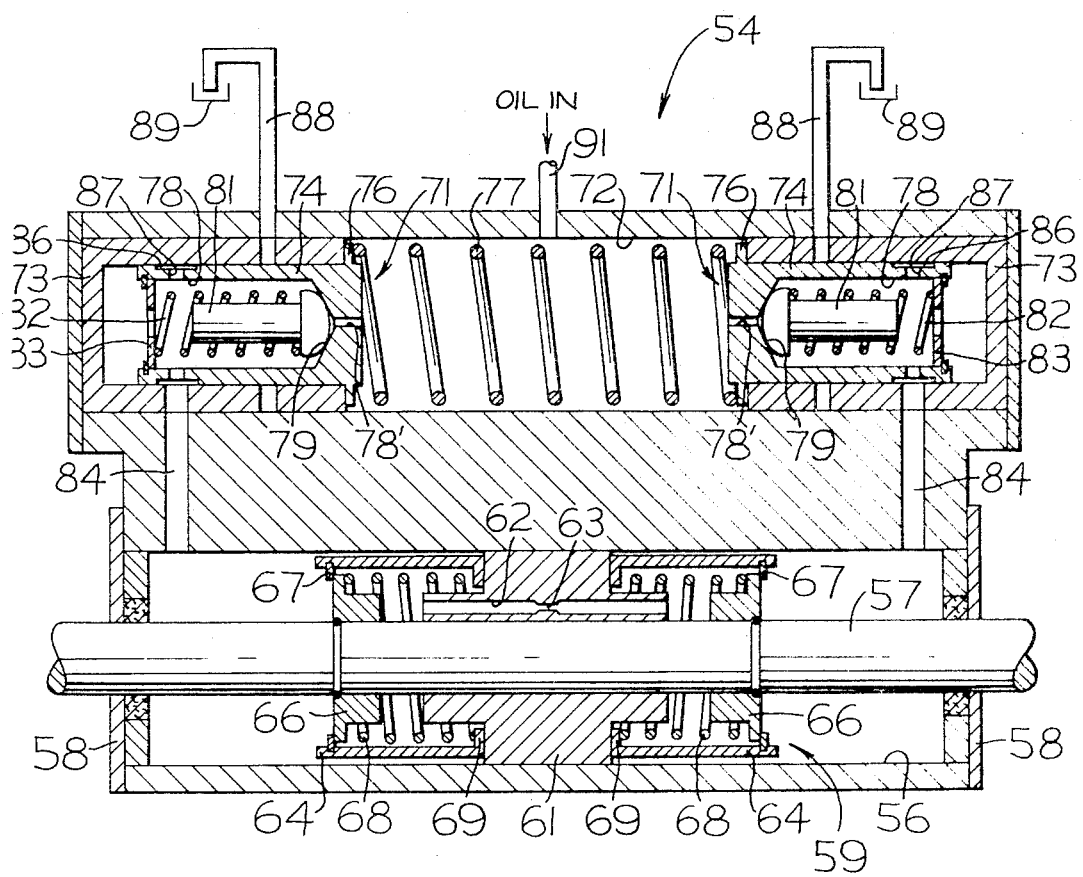

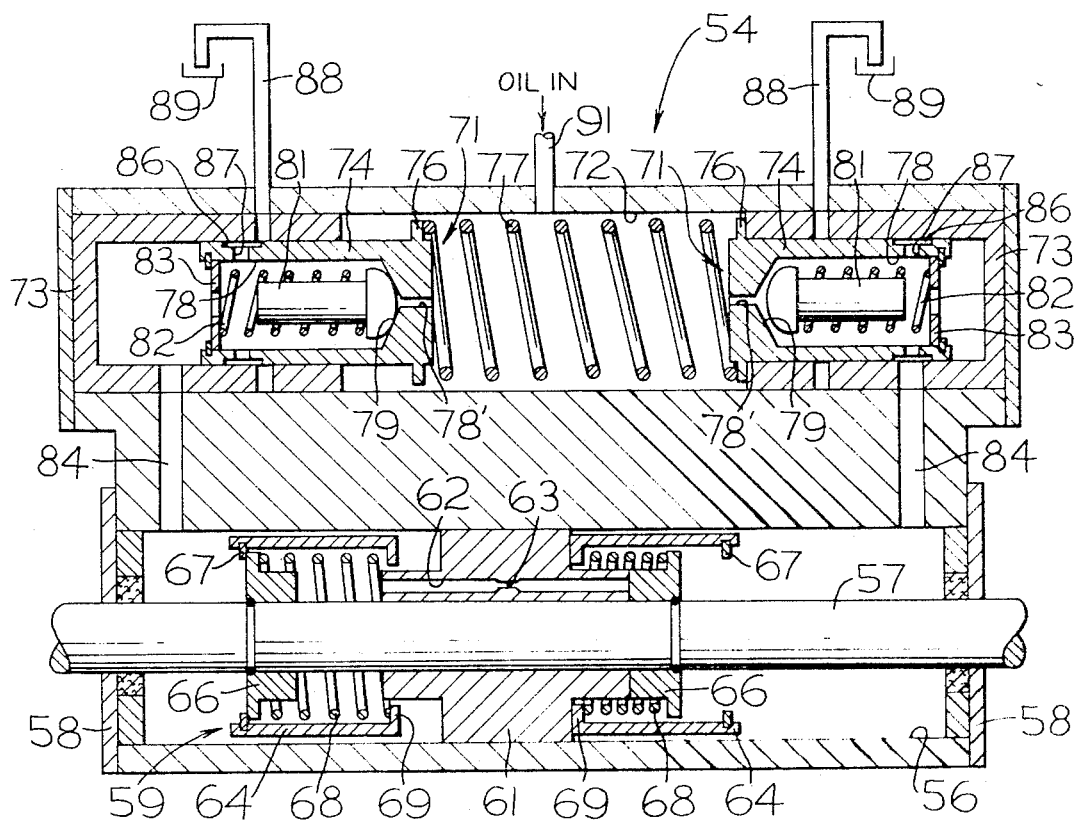

3,465,851
TRANSMISSION OVERSHIFT INHIBITOR
William A. Callegari, Gregory, Mich., Ralph W. Matthews, Franklin, Wis., and David S. Ohaver, Farmington, Shairyl I. Pearce, East Peoria, and Gerald D. Rohweder, Peoria, Ill., assignors to Caterpillar Tractor Co., Peoria, Ill., a corporation of Illinois
Filed Feb. 20, 1967, Ser. No. 617,248
Int. Cl. G05g 9/00; F16d 57/06
U.S. Cl. 188—97    2 Claims

ABSTRACT OF THE DISCLOSURE

A piston within a hydraulic cylinder is coupled to the shift linkage of a vehicle transmission to exert an increased resistance to linkage motion as a single step shift approaches completion. The initial piston motion acts against a readily yieldable element which seats after a limited amount of travel while continued movement causes hydraulic fluid to react against a greater resistance. The mechanism resets automatically, following each shift, at any of the different positions of the shift linkage.

Background of the invention

This invention relates to transmissions for coupling engines to systems which are driven thereby and more particularly to a mechanism which may be coupled to a transmission to strongly define settings of the shift control and to inhibit shifting through more than one transmission setting at a given time without absolutely blocking multiple step shifts.

Many powered vehicles and certain other forms of equipment have a transmission with more than two manually selected speed ranges or settings and in which it is readily possible to shift through more than one step at a time. This is particularly common where the operator's shifting control moves in a linear or simple pivoting manner to change settings although it is also easily done in some forms of transmission where the control element moves in a more complex pattern. Earthworking vehicles such as loaders, motor graders, scrapers and the like are examples of powered mechanisms which often have transmission controls of this type.

While there are circumstances under which multiple step shifting is desirable or even necessary, it may also occur inadvertently or through the operator's lack of appreciation of the damaging effects of such shifts on the equipment. One very significant result of repeated multiple step shifting is accelerated clutch wear. Such shifts impose abnormally high energy absorption rates on the engaging transmission clutches and may create undesirably high stresses in other elements of the mechanism. Further, inadvertent overshifting may result in discomforting and potentially unsafe sudden acceleration or deceleration of the vehicle.

It is of course possible for a skilled operator to effect precision shifting by paying careful attention to the manipulation of the shift control. However, the operator must be concerned with many other factors at any given time and thus it is desirable to provide for accurate shifting with a minimum of diversion of attention. For this purpose, the several positions of the transmission control are usually marked by some kind of visible indicia or notched console plates and spring biased yieldable detents of one kind or another are often provided to enable the operator to sense each transmission setting. Such provisions have still required an undesirable diversion of operator attention and have not been fully adequate to avoid inadvertent overshifting.

Summary of the invention

The present invention is a compact mechanism adapted to be coupled to a transmission shift control, or any of the linkage elements associated therewith, to limit easy movement of the control to a one step change in the transmission setting while providing for multiple shifts through the application of a greater force to the control. The differential resistance aids in providing a more positive indication that a one step shift has been completed without absolutely blocking a multiple shift.

The mechanism may take several forms but will in general utilize a piston which must move within a fluid filled cylinder concurrently with motion of the transmission shift control. Hydraulic circuitry at the cylinder is arranged to offer comparatively little resistance to the initial movement of the piston which corresponds to a portion of a one step shift of the transmission. However, further movement requires that the piston, acting through the fluid, move an element which is itself subject to a yieldable counterforce exerted by spring means or the like. The increased resistance, which is momentarily reduced by the momentum of the shift movement and by such detent means as may be present, enables better sensing by the operator of the completion of a one step shift and inhibits inadvertent overshifting. Return fluid lines in the system provide for a reestablishment of the initial fluid pressures following the shift so that the mechanism resets itself for operation during a subsequent shift. The return lines include a flow restriction so that such passages do not have a significant effect on the system during the shifting operation.

While the mechanism is basically compact enough to be included in a transmission as an internal component thereof, it is also readily adaptable to being designed as a separate attachment for existing systems as it is only necessary to couple the piston to some moving element of the existing shift linkage.

Accordingly, it is an object of this invention to facilitate the shifting of transmissions in motor driven equipment.

It is another object of this invention to provide mechanism enabling an operator to sense a one step shift in a transmission with greater reliability and less diversion of attention from other operations, while providing for multiple step shifts when desired.

It is still another object of this invention to reduce or eliminate reliance on visual indicia, notched console plates, and critical linkage adjustments, at the shifting control of a transmission.

The invention together with further objects and advantages thereof will be better understood by reference to the following description of certain preferred embodiments taken in conjunction with the accompanying drawings.

Brief description of the drawings

In the accompanying drawings, FIG. 1 is an axial section view of a first embodiment of the invention with certain hydraulic circuit elements being shown schematically;

FIG. 2 is an axial section view of a second embodiment of the invention with movable elements thereof shown in the positions which occur prior to a typical shifting operation, certain elements of the structure being shown schematically; and FIG. 3 is an axial section view of the mechanism shown in FIG. 2 with movable elements being shown in changed positions which occur in the course of a shifting operation.

Description of the preferred embodiments

Referring now to the drawings, and more particularly to FIG. 1 thereof, the several elements of the over-shift inhibitor 11 may be largely contained within a housing 12 having a cylindrical bore 13 with end closure members 14 at each end thereof. A cylindrical piston 16 is disposed within the bore 13 in coaxial relationship therewith and is of substantially less length in order that it may be moved longitudinally therein. The piston 16 is secured to a shift linkage rod 17 which extends along the axis of bore 13 and projects through each end closure 14. One end of rod 17 is coupled to a transmission shifting control element 18 so that the piston 16 is moved axially within the bore 13 by manipulations of the shifting control. In some systems the rod 17 may be a direct component of the linkage between shift control 18 and the transmission, and in these cases the opposite end of rod 17 extends from the inhibitor 11 to make the appropriate connections with other elements of the system in the conventional manner.

The transmission shift control 18 is shown schematically in FIG. 1 as being of a type which has a lever 19 with a knob 21 adapted to be grasped by an operator and pivoted about a pin 20, as indicated by arrows 22, to effect shifts. A pin 23 at the lower end of lever 19, below the pivot 20, engages in a transverse slot 24 at the end of rod 17 to convert the angular motion of the lever into linear movement of the rod. The number of steps, or speed ranges, through which the control 18 may be shifted will vary for different transmissions, five such settings being indicated in FIG. 1 by arrow 25 and indicia 30 on rod 17.

To aid in locating and holding the several transmission settings 30, a detent mechanism 92 is provided at control 18 and may be of the type comprised of a ball 93 disposed in a bore 94 having a compression spring 96 therein. Spring 96 urges the ball 93 towards an arcuate edge of a plate 97 carried on lever 19 and centered on the pivot 20 thereof. Ball 93 may seat in any of a plurality of notches 98, in the edge of plate 97, corresponding to the several settings of the transmission.

The shifting control structure 18 may take a variety of other forms in practice and differing types of connecting linkage between the piston 16 and control 18 may be needed to adapt to the peculiarities of particular systems.

The resistance which inhibitor 11 offers to shifting manipulations of the control lever 19 is exerted against the piston 16 by a volume of hydraulic fluid, such as oil, contained within the bore 13. The oil is supplied from any suitable hydraulic system or reservoir through an inlet conduit 26 which communicates with both ends of bore 13 through passages 27 each of which has a check valve 28 therein. Both check valves 28 are arranged to admit oil into the bore 13 from inlet conduit 26 while blocking any oil movement in the reverse direction.

Considering now the mechanism for controlling the fluid reaction against piston 16, an additional bore 29 within the housing 12 contains two axially slidable cylinders 31 and 32. Each cylinder 31 and 32 conforms in diameter to the bore 29 and is hollow except for head portions 33 at the adjacent ends of the two cylinders. Compression springs 34 and 36 are disposed within cylinders 31 and 32, respectively, and bear against the end closures 37 of bore 29 to urge both cylinders toward the center thereof. As will hereinafter be discussed in more detail, spring 36 exerts a substantially greater force against the associated cylinder 32 than spring 34 exerts against cylinder 31.

A pressure relief chamber 38 is defined at the center of bore 29 between the adjacent ends 33 of cylinders 31 and 32 which are held apart by a spacer 39 extending transversely across the bore. The relief chamber region 38 of bore 29 is communicated with both ends of bore 13 through a passage having forks 41 and 42 leading to the opposite ends of bore 13. A check valve 43 in each of the forks 41 and 42 forestalls the direct passage of oil from one end of bore 13 to the other upon movement of piston 16.

When the shift control 18 is operated to change the transmission setting, the resultant movement of piston 16 forces oil from one end of bore 13 towards the relief chamber 38 causing a pressure rise therein. The oil pressure then reacts against the heads 33 of cylinders 31 and 32 in such a way as to tend to drive the cylinders towards the ends 37 of bore 29 against the force of the associated springs 34 and 36. Inasmuch as spring 34 exerts less resistance than the stronger spring 36, the initial effect of the pressure increase in chamber 38 is to drive cylinder 31 towards end 37' of bore 29 while cylinder 32 remains relatively fixed. However, after cylinder 31 seats against end closure 37' further movement of piston 16 is possible only by similarly displacing the second cylinder 32 against the force exerted by the heavier spring 36.

Thus, the net effect of the regulating structure within bore 29 is to offer relatively little resistance to an initial amount of movement of piston 16 and then to offer an increased resistance to any continued movement of the piston. By appropriately proportioning the several elements of the structure, the amount of easy piston movement is generally fixed to correspond to about one-half to two-thirds of a one step shift of the transmission control 18. The momentum of the shifting motion combined with the force exerted by detent 92 momentarily acts against the increased resistance so that the one step shift is readily completed but any continued movement of control knob 21 encounters a substantially greater resistance.

To facilitate operation of the inhibitor 11 in the above-described manner, certain additional hydraulic connections are required. A conduit 44, for example, connects the oil inlet conduit 26 with a pair of passages 46 which extend into bore 29 and communicate with annular grooves 47 around each of the cylinders 31 and 32. Grooves 47 are in turn communicated with the interior of the associated cylinders 31 and 32 through apertures 48 in the walls thereof. The effect of these connections is to transmit pressure fluctuations in the oil supply to the inside surfaces of cylinder heads 33 and thus to cancel out the effects of such fluctuations insofar as the operation of the inhibitor is concerned.

In the absence of further provisions, the mechanism would permit only a two-step change in the transmission setting at a given time inasmuch as further movement of the control 18 would be stopped once cylinder 32 seated against the adjacent end closure 37. To avoid this effect a drain conduit 49 connects conduit 44 with a passage 51 which communicates with bore 29 at a location where it remains closed by cylinder 32 until such time as the cylinder has retracted from spacer 39. The conduit 49 may be connected with a suitable drain sump instead of conduit 44 where this arrangement is more convenient.

To reset the inhibitor 11 for a subsequent shifting cycle, a conduit 52 connects conduit 44 with a restricted flow passage 53 leading to chamber 38. Thus, springs 34 and 36 may slowly return the associated cylinders 31 and 32 towards spacer 39 inasmuch as the oil between the cylinders may escape through passage 53. Owing to the restriction in the drain passage 53, the amount of oil which can escape therethrough in a limited period of time is not sufficient to interfere with the inhibiting action of the mechanism during a shift of the transmission control 18.

The inhibitor structure may be modified in various ways while effecting similar results. Referring now to FIG. 2, a second embodiment of the invention is shown which also has a housing 54 with a bore 56 through which a shift linkage rod 57 extends. Rod 57 may be connected to the shifting linkage of a transmission in any appropriate manner as hereinbefore discussed relative to the first embodiment of the invention. As in the previous instance, the rod 57 extends axially through bore 56 and through end closures 58 thereof. Within the bore 56 an annular piston assembly 59 is disposed coaxially with respect to the rod 57.

The initial amount of relatively easy travel of the shift linkage rod 57 is provided for in this embodiment by the internal structure of the piston assembly 59 which includes a central annular piston member 61 conforming in diameter to the bore 56 and slidable along rod 57. To provide for resetting of the inhibitor, as well hereinafter be discussed in more detail, an axial passage 62 with a flow restriction 63 extends through the piston 61. A pair of hollow cylinders 64 are disposed one on each side of the piston 61 and abut thereagainst, the cylinders having an inside diameter substantially greater than the thickness of rod 57. One of a pair of annular spring seats 66 is secured to rod 57 at each side of piston 61 within the outer end portion of the associated cylinder 64. A ring 67 projects radially inward from the outer end of each cylinder 64 to serve as a stop for the associated spring seat 66. Further elements of the piston assembly 59 are a pair of compression springs 68 each being disposed coaxially with respect to the rod 57 and bearing against one of the spring seats 66 and against an inwardly directed lip 69 at the inner end of each cylinder 64.

Between shifting operations, when the rod 57 is stationary, springs 68 act to center the piston 61 between the spring seats 66 and to maintain the spring seats in contact with rings 67 as shown in FIG. 2. However, if the rod 57 is moved in an axial direction as occurs during a transmission shifting operation one of the springs 68 is compressed, as shown in FIG. 3, as to the associated spring seat 66 moves towards the piston 61 and ultimately makes contact therewith. This much movement of the rod 57 is resisted only by the relatively small counterforce exerted by spring 68 and corresponds to a portion of a one-step shift of the transmission control as hereinbefore described.

The above-described action of the piston assembly 59 during the initial portion of a shifting movement of rod 57, specifically the compression of spring 68 rather than movement of the assembly as a whole, results from the back pressure exerted on the piston by the oil which fills bore 56. The piston assembly cannot move as a unit without forcing oil out of one end of the bore and as will hereinafter be described this requires more force than is needed to compress spring 68. After the spring seat 66 has contacted piston 61, further compression of spring 68 is impossible and any continued movement of rod 57 must be accompanied by release of oil from an end of bore 56. To control the oil flow while maintaining a strong back pressure against continued piston movement, a pair of relief valve mechanisms 71 are contained within a second bore 72 of housing 54.

Referring again to FIG. 2, the relief valves 71 are disposed at opposite ends of bore 72 and each has an outer cylindrical housing 73 which fits coaxially therein. Each such housing 73 has an axially movable member 74 of cylindrical configuration which is disposed therein and which has a flange 76 at the inner end which seats against the end of the associated housing. A compression spring 77 is disposed within the central region of the bore 72 with opposite ends abutted against the flanges 76 of the two members 74 so that each of the members is urged outwardly into its housing 73 by the spring.

Each member 74 has an axial passage 78 which is constricted at the end closest to the center of bore 72 forming a valve seat 79. A valve member 81 is urged against each seat 79 by a compression spring 82 carried within passage 78 and held therein by an apertured retainer 83 at the end of member 74 which is opposite from the valve seat. Thus the restricted portion 78' of each passage 78 is held normally closed.

The interior region of each relief valve housing 73 is communicated with the corresponding end of bore 56 by one of a pair of passages 84, each such passage being communicated with an annular groove 86 around the outer surface of the slidable member 74 near the end thereof remote from valve seat 79 when the member 74 is held in its normal position with flange 76 abutted against the end of housing 73. Groove 86 in turn communicates with the interior of the slidable member 73 through radial passages 87 therein.

Thus, as shown in FIG. 3, continued movement of the rod 57 following compression of one of the piston assembly springs 68 forces oil from an end of bore 56 into the interior region of the slidable member 74 of the relief valve mechanism 71 at the corresponding end of bore 72. The slidable member 74 is thus forced towards the center of bore 72 against the action of the spring 77. Spring 77 exerts a substantial counterforce against such movement and thus the continued shifting movement of rod 57 is only accomplished by the application of a substantially greater force than was required for the initial portion of the movement.

To release oil from the relief valve mechanism 71 so that the shifting movement against the force of spring 77 may be continued as desired, a pair of drain passages 88 extend into the housing 54 and through the walls of valve housings 73 at a location closer to the center of bore 72 than the passages 84 which communicate with the ends of bore 56. Thus, when the slidable member 74 has moved inward a sufficient distance as shown in FIG. 3, oil which is forced out of the end of bore 56 may also flow out of the relief valve mechanism 71. The drain passages 88 may transmit such oil to suitable reservoirs 89 as in this example, or may be communicated with the oil supply inlet 91 at the center of bore 72.

The movement of oil out of one end of bore 56 as described above also requires that additional oil be admitted to the other end of the bore. This is accomplished automatically as illustrated in FIG. 3 in that the valve element 81 of the valve member 71 at the corresponding end of bore 72 lifts from its seat 79 allowing the necessary oil to flow to the end of bore 56 through the passage 84 thereat.

As in the previously described embodiment of the invention the mechanism will automatically reset itself for subsequent cycle of operation following each shifting operation. This results in that the springs 68 of piston assembly 59 will center the piston 61 between spring seats 66 once the shifting motion of rod 57 has ceased. The necessary exchange of oil between opposite ends of bore 56 during the centering movement occurs through the restricted flow passage 63 in the piston. As in the previous instance the restriction 63 in this passage prevents any significant exchange of oil directly between the two ends of bore 56 during the shifting operation. In addition, such passage 63 is closed during the later portion of the shifting operation by the abutment of a spring seat 66 against the end of piston 61.

While the invention has been disclosed with respect to certain exemplary embodiments it will be apparent that numerous variations are possible and it is not intended to limit the invention except as defined in the following claims.

What is claimed is:

1. An overshift inhibitor for the shift control of a transmission comprising:
   a housing having first and second liquid containing bores, the central region of said second bore being communicated with spaced apart regions of said first bore through a forked passage,
   a check valve disposed in each fork of said passage whereby the direct exchange of liquid between said spaced apart regions of said first bore is prevented,
   a slidable piston disposed within said first bore between said spaced apart regions thereof,
   a rod extending into said first bore for transmitting movement of said transmission shift control to said piston,
   a first resiliently positioned element disposed in said second bore to react against the forcing of liquid into said second bore by movement of said piston, said first resiliently positioned element being yieldable in response to a predetermined liquid pressure level in said second bore, said resiliently positioned element being a cylinder disposed coaxially in said second bore together with a first spring urging said cylinder toward said central region of said second bore, and relief means maintaining the liquid pressure in said second bore below said predetermined level during an initial amount of movement of said transmission shift control, said relief means being a second cylinder disposed coaxially in said second bore and a second spring urging said second cylinder toward said central region of said second bore, said second spring having less spring force than said first spring.

2. An overshift inhibitor for the shift control of a transmission comprising:

a housing having first and second liquid containing bores with spaced apart regions of said first bore being communicated with the central region of said second bore, a slidable piston disposed within said first bore between said spaced apart regions thereof, a rod extending into said first bore for transmitting movement of said transmission shift control to said piston, a first resiliently positioned element disposed in said second bore to react against the forcing of liquid into said second bore by movement of said piston, said first resiliently positioned element being yieldable in response to a predetermined liquid pressure level in said second bore, said first resiliently positioned element being a cylinder disposed coaxially in said second bore and a first spring urging said cylinder toward said central region of said second bore, relief means maintaining the liquid pressure in said second bore below said predetermined level during an liquid inlet being comunicated with said spaced apart control, said relief means being a second cylinder disposed coaxially in said second bore and a second spring urging said second cylinder toward said central region of said second bore, said second spring having less spring force than said first spring, and a liquid inlet conduit connecting with said housing, said liquid inlet being communicated with said spaced apart regions of said first bore and with the end regions of said second bore at the opposite ends of said cylinders from said central region of said second bore and wherein a relatively restricted bleed passage communicates with said central region of said second bore.

References Cited

UNITED STATES PATENTS

| | | | |
|---|---|---|---|
| 1,310,199 | 7/1919 | Manton. | |
| 1,667,260 | 4/1928 | Jackson | 74—473 X |
| 2,529,741 | 11/1950 | Roberts | 74—473 |
| 3,312,119 | 4/1967 | Heald | 74—473 |

FOREIGN PATENTS

| | | |
|---|---|---|
| 400,592 | 12/1942 | Italy. |
| 502,340 | 2/1920 | France. |

GEORGE E. A. HALVOSA, Primary Examiner

U.S. Cl. X.R.

74—473

PO-1050
(5/69)

UNITED STATES PATENT OFFICE
CERTIFICATE OF CORRECTION

Patent No. 3,465,851          Dated September 9, 1969

Inventor(s) W. A. Callegari, et al

It is certified that error appears in the above-identified patent and that said Letters Patent are hereby corrected as shown below:

In claim 2, (column 8, line 3) "liquid inlet being communicated with said spaced apart" should read --initial amount of movement of said transmission shift--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents